United States Patent
Morris et al.

(10) Patent No.: US 6,275,266 B1
(45) Date of Patent: *Aug. 14, 2001

(54) APPARATUS AND METHOD FOR AUTOMATICALLY DETECTING AND CONFIGURING A TELEVISION DISPLAY FOR A PERSONAL COMPUTER

(75) Inventors: Charles F. Morris; Gregory T. Lydon; Mark Keith Reha, all of San Jose, CA (US)

(73) Assignee: Philips Electronics North America Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/967,974

(22) Filed: Nov. 12, 1997

(51) Int. Cl.[7] ............... H04N 7/00; H04N 11/20
(52) U.S. Cl. .............. 348/552; 348/446
(58) Field of Search ............ 348/552, 553, 348/705, 446, 441, 564; 345/1, 3, 2

(56) References Cited

U.S. PATENT DOCUMENTS

| 5,517,209 | | 5/1996 | Holland et al. ............ 345/119 |
| 5,761,606 | * | 6/1998 | Wolzein ............ 455/6.2 |
| 5,781,241 | * | 7/1998 | Donovan ............ 348/446 |
| 5,790,201 | * | 8/1998 | Antos ............ 348/552 |
| 5,815,208 | * | 9/1998 | Samela ............ 348/446 |
| 5,841,418 | * | 11/1998 | Bril et al. ............ 345/3 |
| 5,926,175 | * | 7/1999 | Sturgeon et al. ............ 348/552 |
| 5,926,207 | * | 7/1999 | Vaughan et al. ............ 348/552 |
| 6,020,863 | * | 2/2000 | Taylor ............ 345/3 |

FOREIGN PATENT DOCUMENTS

0661627A1    7/1995   (EP) .

OTHER PUBLICATIONS

A PC–Controlled Multiple Window Display Card for TV., T.H. Ooi et al, IEEE Trans. on Cons. Electr., vol. 40, No. 4, pp. 869–878, No. 1994.
TV Out DLL Design Specification, Philips, Rev: 1.00.04, Aug. 4, 1997.

* cited by examiner

Primary Examiner—Victor R. Kostak

(57) ABSTRACT

A software architecture for a personal computer enables control of an attached television set as a graphic output device, where the software architecture includes a dynamically linked library storing executable library routines that can be called by a computer system routine across an application programming interface, and a hardware extraction layer having hardware-specific routines that are called by a selected library routine to perform a specific hardware operation. The hardware-specific routines control operation of a graphics core configured to control the television set, for example by detecting whether the television set is attached to thecomputer system. Additional operations supported by the dynamically linked library include automatically adjusting the size and resolution of Windows (or portions thereof) output to the television set.

21 Claims, 2 Drawing Sheets

APPARATUS AND METHOD FOR AUTOMATICALLY DETECTING AND CONFIGURING A TELEVISION DISPLAY FOR A PERSONAL COMPUTER

TECHNICAL FIELD

The present invention relates to the use of television monitors with personal computers, more specifically to the use of a television as an output device for a personal computer.

BACKGROUND ART

The current state of using a television set as a display for personal computers generally involves the use of a digital encoder card in combination with a computer VGA adapter card. The digital encoder card is used to convert the red, green and blue (RGB) signals from a computer VGA adapter card into a composite video signal having either a PAL or NTSC format for driving a television set. Such arrangements may require some manual configuration between the computer VGA adapter card and the digital encoder card to provide a composite video signal having acceptable display qualities relative to the hardware requirements and specifications of the television set.

Although the computer VGA adapter card may have an associated device driver for controlling hardware-related operations within the VGA display adapter, there is no software control of the digital encoder card that supplies the PAL or NTSC format composite video signals to the television set. Hence, the personal computer is unaware of the presence of the television set, let alone any performance or technical specifications of the television. Hence, all hardware functions associated with the television need to be performed manually by a user.

SUMMARY OF THE INVENTION

There is a need for an arrangement that enables a computer system to control operations of the television set, including controlling the digital encoder that supplies video signals to the television set.

There is also a need for an arrangement in a computer system that enables a computer system routine to detect a connection status of a television set.

There is also a need for an arrangement in a computer system for dynamically configuring the television set using hardware-specific routines that interface between a computer system routine and the hardware operations of the television set.

These and other needs are attained by the present invention, where a software architecture for a personal computer includes a library storing executable routines that can be called by a computer system routine across a application programming interface, and a hardware extraction layer having hardware-specific routines for selectively controlling the television set in response to a call by one of the executed library routines.

According to one aspect of the present invention, a method for establishing a television set as a graphic output object for a computer system includes calling a selected executable routine from a linked library across an application programming interface by a computer system routine, where the linked library has a plurality of executable routines for controlling the television set, and at least one of the executable routines is configured for detecting a presence of a television set. The method also includes executing a hardware-specific routine associated with hardware operation of the television set in response to execution of the selected executable routine, and returning a hardware-specific result to the called selected executable routine. The method also includes sending an execution result by the called selected executable routine to the computer system routine across the application programming interface based on the hardware-specific result. Use of an application programming interface by the computer system routine enables the computer system routine to be programmed generically to cause execution of high level operations related to television display functions, where hardware-specific operations necessary for the high level operations are performed by the hardware-specific routine. Hence, calling a selected executable routine across the application programming interface enables the computer system to use generic commands for television display operations, where a linked library and the hardware-specific routine perform specific operations necessary for a given television set.

Another aspect of the present invention provides a computer system for outputting graphics to a television set, comprising a computer system routine executing within an operating system of the computer system, a linked library storing a plurality of library routines each executable in response to a first call by the computer routine across a application programming interface, and a hardware abstraction layer including hardware-specific routines for detecting a presence of the television set and for selectively controlling the television set in response to a second call by one of the library routines selected by the computer system routine. Use of the hardware abstraction layer having hardware-specific routines enables the computer system routine to be programmed generically to output to any type of television set, where a library routine executes television hardware-related operations and returns results based on the generic calls from the computer system routine and selected hardware-specific routines called by the executed library routine. In addition, the library routines may be dynamically-linked routines that may be added or periodically updated separately from the computer operating system, enabling performance upgrades in the computer system in an efficient manner.

Additional objects, advantages and novel features of the invention will be set forth in part in the description which follows, and in part will become apparent to those skilled in the art upon examination of the following or may be learned by practice of the invention. The objects and advantages of the invention maybe realized and attained by means of the instrumentalities and combinations particularly pointed out in the appended claims.

BRIEF DESCRIPTION OF THE DRAWINGS

Reference is made to the attached drawings, wherein elements having the same reference numerical designations represent like elements throughout and wherein.

BEST MODE FOR CARRYING OUT THE INVENTION

Figure 1:
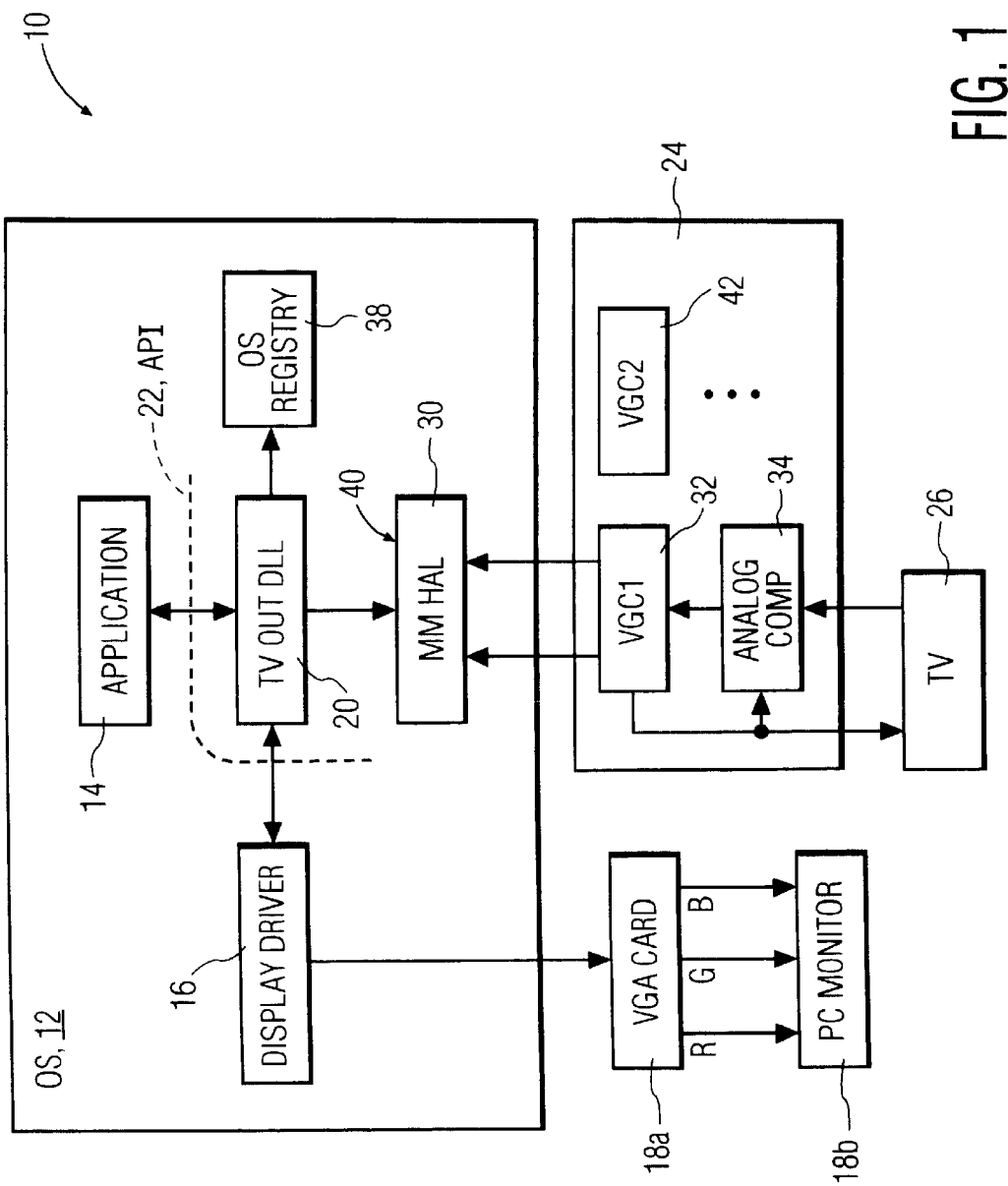
FIG. 1 is a block diagram of a computer system configured for controlling a television set as a graphic output device set according to an embodiment of the present invention.

FIG. 1 is a block diagram of a computer system 10 for controlling a television set according to a embodiment of the present invention. As described below, the computer system 10 is configured to automatically detect the presence of a television set as an output device, for example during power-on-self-test (POST) or at regular intervals. The computer system 10 also is configured to validate mode changes with respect to hardware capabilities and memory requirements when the encoder circuitry of the television set is configured for a particular Windows operating system graphic resolution.

According to the disclosed embodiment, the computer system 10 includes a Windows-based operating system 12 and computer system routines 14 and 16 operating within the environment of the operating system 12. The operating system 12 may be any conventional operating system, for example a Windows 95 operating system. The computer system routine 14 may be a graphics-based software application, for example a multi-media computer system routine that is executable in the computer system environment of the operating system 12.

The computer system 10 also includes a display driver 16 as another type of computer system routine executable in the computer system 10. The display driver 16 is typically configured for controlling a computer VGA adapter card 18*a*, for example by controlling rasterizing of graphic data into a pattern of pixels. The computer VGA adapter card 18*a* outputs analog RGB signals to drive a computer monitor display 18*b*. According to the disclosed embodiment, the display driver 16 may be a 16-bit driver, or a driver system having a 16-bit driver and a 16 bit to 32 bit converter to provide compatibility with an operating system having a 32-bit environment.

Although the analog RGB output signals of the VGA card 18*a* may be supplied to a digital encoder as described in the Background Art section above, such a arrangement would result in loss of control with respect to the displayed graphic image relative to the capabilities of the television. Moreover, the display driver 16 would be incapable of determining the presence of the television monitor.

According to the disclosed embodiment, the computer system 10 includes a dynamically linked library 20 for storing a plurality of library routines, where each stored library routine is executable in response to a call supplied by one of the computer system routines 14 or 16 across an application programming interface (API) 22. As shown in FIG. 1, the computer system 10 also includes a multimedia hardware abstraction layer (MMHAL) 44 that includes hardware-specific routines, and a graphics core 24 for controlling a television set 26.

The API 22 provides a generic interface for the computer system routines 14 and 16 to abstract the programming of hardware-specific graphics core 24 for controlling operations of the television monitor 26. Specifically, the dynamically linked library 20 includes a plurality of library routines that are executed in response to a call by either by the multi-media application 14 or the display driver 16 for television control operations to be performed.

The library routines control specific television operations at a level that is hardware-independent, i.e., generic to all television sets. Hence, the stored library routines in the DLL 20 execute operations that are specific to television systems, yet independent of specific television hardware. Examples of such operations include: Initialize (e.g., initializing a virtual graphic output path, also referred to as a video encoder pipe stream); IsTvOutEnabled (e.g., determining if the DLL 20 operations are enabled or disabled); IsMonitorAttached (e.g., determining if the TV monitor 26 is attached); GetMode and SetMode (e.g., determining and setting an operation mode of the TV 26, respectively); GetAntiFlicker and SetAntiFlicker (e.g., getting and setting an anti-flicker setting in the TV monitor 26, respectively); GetStandard and SetStandard (e.g., getting and setting the video encoder standard to NTSC, PAL, etc., respectively). Additional details and examples of stored library routines in the DLL are described in the attached Appendix.

As described above, the DLL 20 stores library routines that are hardware-independent. Hence, a library routine called for execution across the API 22 performs the corresponding operation by calling a selected hardware specific routine stored in the hardware abstraction layer 30. Specifically, the multimedia hardware extraction layer (MMHAL) 30 includes hardware-specific routines for selectively controlling components of the graphics core 24. As shown in FIG. 1, the graphics core may include a video graphics controller (VGCI) 32 for a prescribed television monitor 26. Hence, the hardware extraction layer 30 will include a hardware-specific routine for controlling the corresponding video graphics controller according to a prescribed hardware specifications (e.g., the appropriate encoding standard, such as PAL or NTSC). The selected hardware-specific routine selectively returns a hardware-specific result to the called library routine in the dynamically linked library 20. The called library routine in turns sends an execution result to the computer system routine 14 or 16 having called the library routine across the API 22 based on the hardware specific result received from the MMHAL 30. The called library routine may also output television state information to an operating system registry 38.

Hence, the API 22 provides a standardized interface that enables one of the computer systems routines 14 or 16 to control operations in the graphics core 24 by issuing generic calls to the DLL 20. The DLL 20 responds to the generic call by executing a selected one of the library routines, which may invoke a call to one of the hardware-specific routines in the MMHAL 30.

The hardware extraction layer 30 stores the hardware-specific routines that enable the dynamically linked library to include specific routines without concern of the hardware configuration being driven. Hence, the hardware abstraction layer 30 provides a hardware abstraction layer interface 40 that enables the routines in the dynamically linked library 22 to issue calls to the abstraction layer 30 without regard to the specific hardware implementation of the graphics core 24 or the associated television monitor 26.

As shown in FIG. 1, the video graphics core 24 includes an analog comparator 34 that detects the presence of the TV monitor 26 based on analog voltages detected from the TV monitor 26. Alternately, the graphics core 24 may detect the presence of the TV monitor 26 based on a prescribed communication protocol between the TV monitor 26 and the graphics core 24. The graphics core 24 may also include a second video graphics controller (VGC2) 42 configured for driving and controlling a TV monitor (not shown) having a different hardware configuration, such that the hardware extraction layer 30 can control multiple television monitors having respective hardware configurations.

A particular advantage of the disclosed embodiment is that the dynamically linked library 20 and the hardware abstraction layer 30 enable the computer system routines 14 and 16 to automatically detect the presence of the TV monitor 26, without regard for the hardware requirements of the TV monitor 26. Specifically, one library routine executable by the DLL 20 enables automatic detection of the television based upon the interaction between the hardware abstraction layer 30 and the associated hardware in the graphics core 24. The hardware extraction layer 30 determines a hardware-specific result specifying a connection status of the TV monitor 26, and returns the hardware-specific results to the called library routine in the dynamically linked library 20. The called library routine in the DLL 20 in turn sends an execution result to the computer system routine having called that executable library routine.

Figure 2:
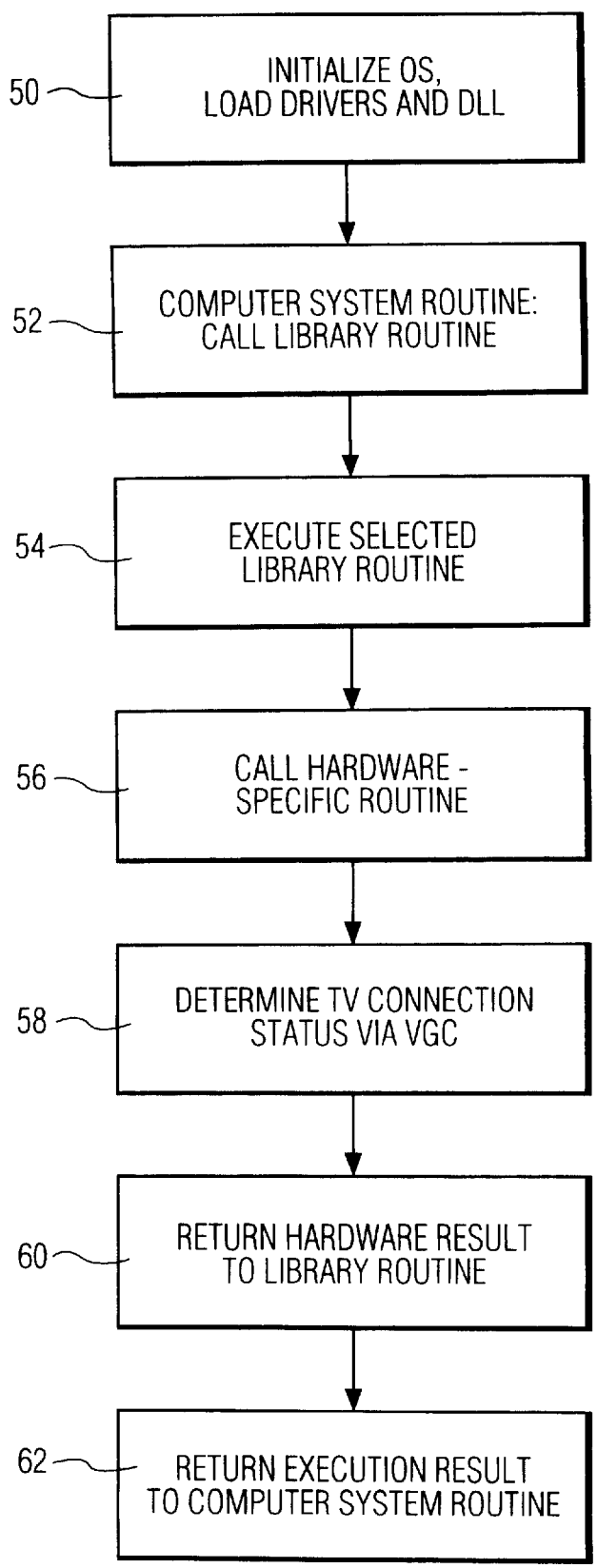
FIG. 2 is a flow diagram illustrating a method for establishing a television set as a graphic output device for a computer system according to embodiment of the present invention.

FIG. 2 is a flow diagram illustrating a method for establishing a television set as a graphic output device for a computer system according to the embodiment of the present invention. The method beings in step 50 by initializing the operating system 12, and loading the display driver 16 and the dynamically linked library 20 for execution from non-volatile memory, such as a hard disk or CD-ROM.

One of the computer system routines, for example the multimedia application 14 or the display driver 16, then calls a selected library routine of the DLL 20 (e.g., IsMonitorAttached) across the API 22 in step 52 to determine whether a TV monitor 26 is attached to the computer system 10. The call by the computer system routine may be part of an initialization routine, or a periodic status check.

The operating system 12 begins execution of the selected library routine in step 54 to perform a television-related and hardware-independent operation. The selected library routine then calls a selected hardware-specific routine from the hardware abstraction layer 30 in step 56. The hardware abstraction layer 30, upon executing the selected hardware-specific routine, detects a status of the VGC 32 in step 58 to determine whether the analog comparator 34 detects a presence of the TV monitor 26. The hardware-specific routine returns the hardware-specific result in step 60 to the executing library routine. The executing library routine in the DLL 20 sends an execution result (e.g., True or False) in step 62 to the computer system routine (e.g., application 14 or display driver 16) across the API 22, based on the hardware-specific execution result from the hardware abstraction layer 30 indicating whether the TV monitor 26 is attached to the system 10.

Hence, the disclosed arrangement enables a television set to be controlled generically by a computer system routine such as a display driver 16, where the display driver 16 can issue calls to a selected library routine in a dynamically linked library 20 across an API 22. The dynamically linked library 20 is preferably installed in a prescribed generic directory (e.g., Windows System directory) to enable access by any software component or computer system routine that requires access to the stored library routines. The selected library routine performs a hardware-independent operation related to controlling a TV monitor by calling a hardware-specific routine within a hardware abstraction layer 30 to perform hardware-specific operations. The dynamically-linked library 20 and the hardware abstraction layer 30 thus provide an efficient interface between the TV monitor 26 and the computer system routines, such as the display driver 16.

Use of the API 22 by the display driver 16 enables the enhanced control of the TV monitor 26, plus providing selective outputs to the PC monitor 18b and the TV monitor simultaneously. For example, the display driver 16 can provision a logical frame buffer address for the TV 26. The display driver 16 can then issue a call to the DLL 20 using the Initialize command (described in the attached Appendix) to establish a virtual graphic output path between the driver 16 and the MMHAL 30 based on the logical frame buffer address.

Another example of the advantageous use of the API 22 by the computer system routine (14 or 16) relates to supplying a selected portion of a graphic information (e.g., a graphic image) to the TV monitor 26. For example, assume the PC monitor 18b displayed a desktop including a multimedia window, where the multimedia window included a multimedia image and a menu bar along a top or bottom edge of the image. The computer routine could call a routine (SetAcqRect) that establishes an acquisition area for the TV monitor 26 relative to rectangular coordinates supplied by the computer system routine. Hence, the DLL 20 and the MMHAL 30 could selectively control outputting a selected portion of the graphic information to the TV monitor 26, where the TV monitor 26 would only display the multimedia image and not the corresponding menu bar. Similar routines may be called from the DLL 20 related to controlling display dimensions and resolutions on the TV monitor 26.

Hence, the disclosed arrangement enables detection and control of a TV monitor 26 by computer system routines using generic calls to a dynamically linked library 20 in communication with a hardware abstraction layer 30.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method for establishing a television set as a graphic output device for a computer system, the television set being coupled to, but not integrated with, the computer system, the method comprising:

calling a selected executable routine from a linked library across an application programming interface by a computer system routine, the linked library having a plurality of the executable routines for controlling the television set, at least one of the executable routines detecting a presence of the television set;

executing a hardware-specific routine associated with hardware operation of the television set in response to execution of the selected executable routine, and returning a hardware-specific result to the called selected executable routine; and sending an execution result by the called selected executable routine to the computer system routine across the application programming interface based on the hardware-specific result.

2. The method of claim 1, further comprising selecting by the computer system routine the television set as the graphic output device based on the execution result sent across the application programming interface.

3. The method of claim 2, further comprising:

determining in the computer system routine a logical frame buffer address for the graphic output device;

calling a second selected one of the executable routines by the computer system routine across the application programming interface and including the logical frame buffer address; and establishing a virtual graphic output path between the computer system routine and a second hardware-specific routine during execution of the second selected one executable routine and based on the supplied logical frame buffer address.

4. The method of claim 3, further comprising:

determining in the computer system routine a second logical frame buffer address for a second graphic output device; and executing a driver routine configured for supplying graphic information from the computer system routine to the second graphic output device.

5. The method of claim 4, further comprising calling a third selected one of the executable routines by the computer system routine across the application programming information for supplying a selected portion of the graphic information to the television set via the virtual graphic output path.

6. The method of claim 3, further comprising:

calling a third selected one of the executable routines by the computer system routine across the application programming interface and including at least one graphic object dimension and resolution; and executing a third hardware-specific routine in response to execution of the third selected executable routine for displaying a graphic object on the television set at a dimension and resolution corresponding to the at least one graphic object dimension.

7. The method of claim 2, wherein the step of calling a selected executable routine comprises calling a routine to identify a video encoder standard of the television set.

8. The method of claim 7, wherein the sending step comprises providing the video encoder standard at least one of NTSC and PAL as the execution result to the computer system routine.

9. The method of claim 2, further comprising periodically calling the selected executable routine to determine an updated connection status for the television set.

10. The method of claim 1, wherein the hardware-specific routine includes converting graphic data to at least one of NTSC and PAL encoding formats in a video graphics card.

11. The method of claim 10, wherein the sending step includes sending a status message indicating successful conversion of the graphic data to the one encoding format.

12. The method of claim 1, wherein the linked library is a dynamically linked library.

13. A computer system for outputting graphics to a non-integrated television set, comprising:

a computer system routine executing within an operating system of the computer system;

a linked library storing a plurality of library routines each executable in response to a first call by the computer system routine across an application programming interface; and a hardware abstraction layer including hardware-specific routines for detecting a presence of the television set and selectively controlling the television set in response to a second call by one of the library routines selected by the computer system routine.

14. The computer system of claim 13, wherein the computer system routine includes a display driver configured for supplying graphics data from the computer system to a display device.

15. The computer system of claim 13, wherein the computer system routine includes a multimedia application configured for supplying graphics data from the computer system to a display device in a prescribed format based on results supplied by the one library routine across the application programming interface.

16. The computer system of claim 13, further comprising a graphics core configured for programming the television and receiving status information from the television in response to execution of a selected one of the hardware-specific routines.

17. The computer system of claim 16, wherein the graphics core includes a video encoder operating according to a prescribed video encoder standard for the television set.

18. The computer system of claim 16, wherein the linked library and the hardware abstraction layer are executable within the operating system and the graphics core is executable within video graphics hardware associated with the television set.

19. The computer system of claim 16, wherein the graphics core controls a plurality of television sets having respective hardware configurations.

20. The computer system of claim 13, wherein the library is a dynamically linked library that includes a library routine configured for sending and receiving television state information to an operating system registry.

21. The computer system of claim 13, further comprising a second computer system routine executing within the operating system and sending a second call to the dynamically linked library across the application programming interface for a selected one of the library routines.

* * * * *